(12) United States Patent
Katano

(10) Patent No.: US 11,506,337 B2
(45) Date of Patent: Nov. 22, 2022

(54) MANUFACTURING METHOD OF HIGH-PRESSURE TANK

(71) Applicant: TOYOTA JIDOSHA KABUSHIKI KAISHA, Toyota (JP)

(72) Inventor: Koji Katano, Toyota (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 81 days.

(21) Appl. No.: 17/333,288

(22) Filed: May 28, 2021

(65) Prior Publication Data

US 2022/0099251 A1 Mar. 31, 2022

(30) Foreign Application Priority Data

Sep. 25, 2020 (JP) .............................. JP2020-160289

(51) Int. Cl.
| | |
|---|---|
| B29C 53/58 | (2006.01) |
| F17C 1/06 | (2006.01) |
| B29C 63/26 | (2006.01) |
| B29L 31/00 | (2006.01) |
| B29K 307/04 | (2006.01) |

(52) U.S. Cl.
CPC ................ F17C 1/06 (2013.01); B29C 53/58 (2013.01); B29C 63/26 (2013.01); *B29K 2307/04* (2013.01); *B29L 2031/7156* (2013.01); *F17C 2201/0109* (2013.01); *F17C 2203/0604* (2013.01); *F17C 2203/066* (2013.01); *F17C 2203/0624* (2013.01); *F17C 2209/2163* (2013.01); *F17C 2209/227* (2013.01); *F17C 2209/232* (2013.01)

(58) Field of Classification Search
CPC .................................. B29C 53/58; F17C 1/16
See application file for complete search history.

(56) References Cited

U.S. PATENT DOCUMENTS

2021/0221081 A1* 7/2021 Katano .................... F17C 1/06

FOREIGN PATENT DOCUMENTS

| JP | 2008-164131 A | 7/2008 |
| JP | 2013-203980 A | 10/2013 |

* cited by examiner

*Primary Examiner* — Jeffry H Aftergut
(74) *Attorney, Agent, or Firm* — Finnegan, Henderson, Farabow, Garrett & Dunner, LLP

(57) ABSTRACT

A manufacturing method of a high-pressure tank including a reinforcement layer configured of fiber reinforced resin including carbon fiber and a liner provided on an inner side of the reinforcement layer includes: a step (a) of preparing the reinforcement layer including a cylindrical portion and a pair of dome portions, the dome portions disposed at respective ends of the cylindrical portion; a step (b) of forming a film on an inner surface of each of the cylindrical portion and the dome portions without using a polymerization catalyst that is deactivated by a component contained in the reinforcement layer; a step (c) of applying a material of the liner to a surface of the film, the material being an uncured material of the liner and containing the polymerization catalyst; and a step (d) of forming the liner by curing the material of the liner applied through a polymerization reaction.

4 Claims, 9 Drawing Sheets

MANUFACTURING METHOD OF HIGH-PRESSURE TANK

CROSS-REFERENCE TO RELATED APPLICATION

This application claims priority to Japanese Patent Application No. 2020-160289 filed on Sep. 25, 2020, incorporated herein by reference in its entirety.

BACKGROUND

1. Technical Field

The present disclosure relates to a manufacturing method of a high-pressure tank.

2. Description of Related Art

Japanese Unexamined Patent Application Publication No. 2008-164131 (JP 2008-164131 A) describes a manufacturing method of a pressure vessel in which an adhesive layer is provided on an outer layer of a hollow vessel formed using a liner material made of a synthetic resin, and carbon fiber or glass fiber is wound on the adhesive layer so as to form a reinforcement layer that is firmly adhered to the hollow vessel.

SUMMARY

As a new manufacturing method of a high-pressure tank in place of a conventional method, the inventor of the present disclosure has devised a method of forming a liner in which a pipe portion and dome portions of a reinforcement layer are separately formed and joined to each other to form a joined body, and a material of the liner is injected into the joined body and is subjected to a polymerization reaction to form the liner. A polymerization catalyst may be used to carry out the polymerization reaction of the material of the liner. With the manufacturing method above, the inventor has found a possibility that, when the fiber forming the reinforcement layer is carbon fiber, a component that is contained in the reinforcement layer and that deactivates the polymerization catalyst may inhibit curing of the material of the liner, and thus a monomer of the material of the liner may remain in the high-pressure tank. A significant amount of cost is required to remove the deactivating component from the reinforcement layer. Therefore, there has been a demand for further improvement of the manufacturing method of the high-pressure tank.

The present disclosure can be implemented in the following aspects.

(1) An aspect of the present disclosure provides a manufacturing method of a high-pressure tank. The manufacturing method of the high-pressure tank is a manufacturing method of a high-pressure tank including a reinforcement layer configured of fiber reinforced resin including carbon fiber and a liner provided on an inner side of the reinforcement layer, and includes: a step (a) of preparing the reinforcement layer including a cylindrical portion and a pair of dome portions, the dome portions disposed at respective ends of the cylindrical portion; a step (b) of forming a film on an inner surface of each of the cylindrical portion and the dome portions without using a polymerization catalyst that is deactivated by a component contained in the reinforcement layer; a step (c) of applying a material of the liner to a surface of the film, the material being an uncured material of the liner and containing the polymerization catalyst; and a step (d) of forming the liner by curing the material of the liner applied through a polymerization reaction.

According to the manufacturing method of the high-pressure tank of this aspect, the film is formed between the inner side of the reinforcement layer and the liner without using the polymerization catalyst that is deactivated by the component contained in the reinforcement layer. With the configuration above, the polymerization catalyst contained in the material of the liner can be suppressed from being deactivated by the component contained in the reinforcement layer. This can suppress curing of the material of the liner from being inhibited when the material of the liner is cured, thereby suppressing residue of the monomer.

(2) In the manufacturing method of the high-pressure tank of the aspect above, the step (b) may include: a step (b1) of forming a first film on the inner surface of the cylindrical portion of the reinforcement layer; a step (b2) of forming a second film on the inner surface of each of the dome portions of the reinforcement layer; and a step (b3) of joining an end of the first film and ends of the second films when the dome portions are joined to the respective ends of the cylindrical portion.

According to the manufacturing method of the high-pressure tank of this aspect, the first film and the second films are formed before the dome portions and the cylindrical portion are joined. Therefore, the formation of the first film and the second films can be confirmed. Accordingly, the film can be formed to be substantially uniform on the inner sides of the cylindrical portion and the dome portions.

(3) In the manufacturing method of the high-pressure tank of the aspect above, the step (b1) may include a step of forming the first film such that the end of the first film to be joined to the end of the second film in the step (b3) configures a first inclined surface that is an inclined surface facing a direction inclined with respect to a central axis of the cylindrical portion, the step (b2) may include a step of forming the second film such that the end of the second film to be joined to the end of the first film in the step (b3) configures a second inclined surface that is an inclined surface facing the first inclined surface, and the step (b3) may include a step of joining the first inclined surface and the second inclined surface.

According to the manufacturing method of the high-pressure tank of this aspect, the first inclined surface faces the direction inclined with respect to the central axis of the cylindrical portion, and the second inclined surface faces the first inclined surface. Therefore, as compared with the case where the first inclined surface faces in a direction parallel to the central axis of the cylindrical portion, an area of a joined surface between the first inclined surface and the second inclined surface becomes larger. Even when a monomer is generated during curing of the material of the liner and the monomer moves in a gap of the joined surface, the monomer can be suppressed from reaching the reinforcement layer, as compared with the case where the joined surface between the first inclined surface and the second inclined surface faces in the direction parallel to the central axis of the cylindrical portion.

(4) In the manufacturing method of the high-pressure tank of the aspect above, the step (b) may be a step of forming the film using an epoxy resin.

According to the manufacturing method of the high-pressure tank of this aspect, the film can be formed using an inexpensive and highly stable epoxy resin.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

A. First Embodiment

Figure 1:
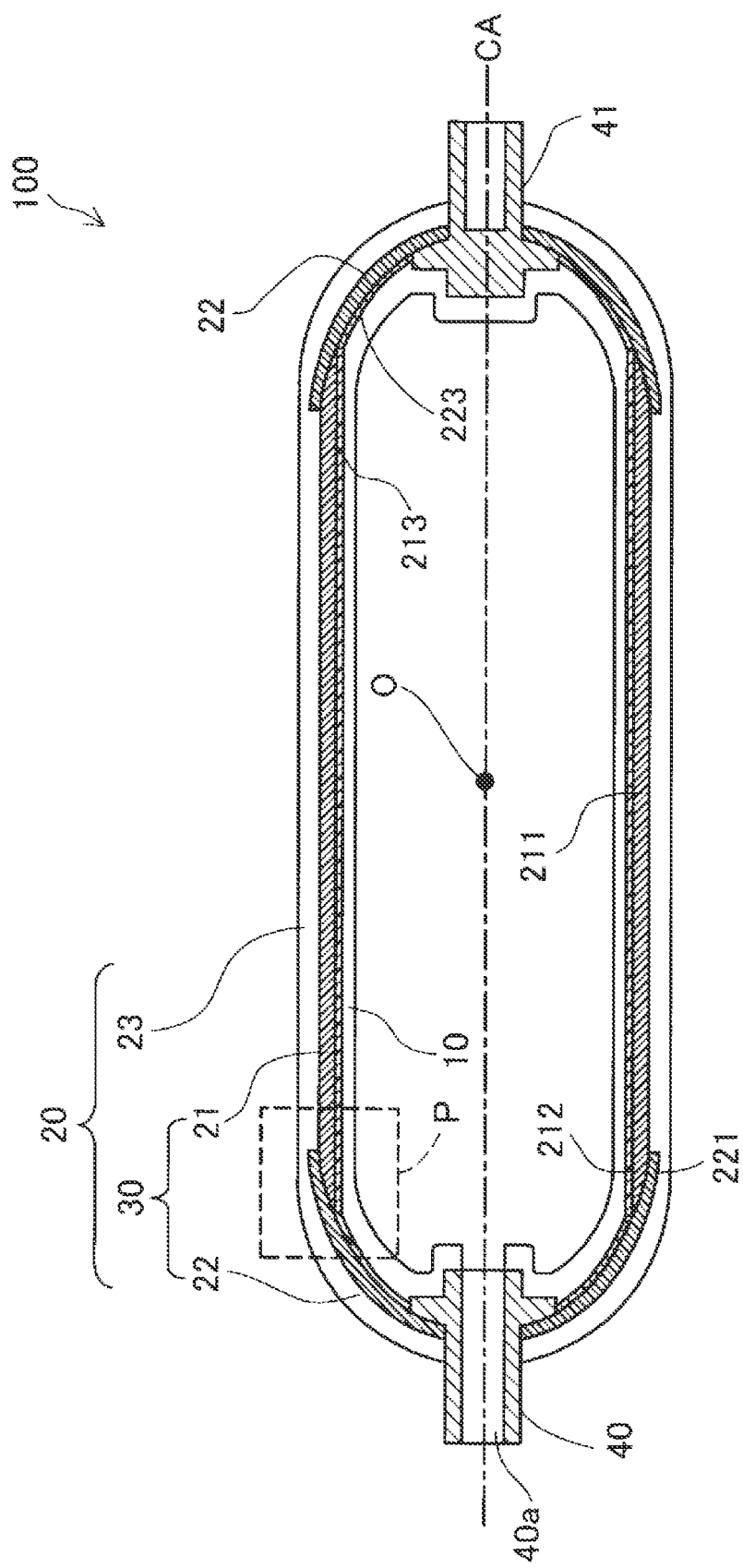
FIG. 1 is a sectional view showing a configuration of a high-pressure tank according to a first embodiment.

FIG. 1 is a sectional view showing a configuration of a high-pressure tank 100 according to a first embodiment. The high-pressure tank 100 is a storage container that stores a high-pressure fluid such as high-pressure hydrogen. The high-pressure tank 100 is mounted on a fuel cell vehicle, for example, to supply hydrogen to a fuel cell.

The high-pressure tank 100 includes a liner 10 and a reinforcement layer 20. The liner 10 constitutes an inner wall of the high-pressure tank 100. The liner 10 is made of a resin having a property of blocking a gas charged in an internal space from leaking to the outside. The liner 10 is formed using reaction injection molding (RIM). In the present embodiment, nylon 6 is used as the resin used for forming the liner 10. As the resin used for forming the liner 10, polyamide resins such as nylon 66, nylon 610, nylon 612, nylon 11, and nylon 12, polyurethane, polyester, and polyepoxy, for example, may be used in addition to nylon 6.

The reinforcement layer 20 is a layer made of fiber reinforced resin for reinforcing the liner 10. The reinforcement layer 20 is disposed on an outer surface of the liner 10. The reinforcement layer 20 includes a joined body 30 provided with a cylindrical portion 21 and dome portions 22, and an outer helical layer 23. The dome portions 22, the cylindrical portion 21, and the outer helical layer 23 included in the reinforcement layer 20 are made of fiber impregnated with resin. In the present embodiment, carbon fiber is used as the fiber forming the dome portions 22, the cylindrical portion 21, and the outer helical layer 23 included in the reinforcement layer 20. As the resin impregnated in the carbon fiber, for example, a thermosetting resin such as a phenol resin, a melamine resin, or an epoxy resin can be used. In the present embodiment, the joined body 30 further includes a first neck 40 and a second neck 41 that are joined to the dome portions 22.

The cylindrical portion 21 has a substantially cylindrical shape with both ends open. The cylindrical portion 21 has a straight pipe portion 211 and reduced diameter portions 212 provided at respective ends of the straight pipe portion 211. The reduced diameter portions 212 each have a shape in which an outer diameter of the reduced diameter portion 212 is reduced toward the corresponding end of the cylindrical portion 21. Note that, an inner diameter of the straight pipe portion 211 and an inner diameter of the reduced diameter portion 212 are preferably equal. The dome portions 22 are joined to the respective ends of the cylindrical portion 21. The cylindrical portion 21 may not be provided with the reduced diameter portions 212 and may be entirely configured of the straight pipe portion 211.

Figure 2:
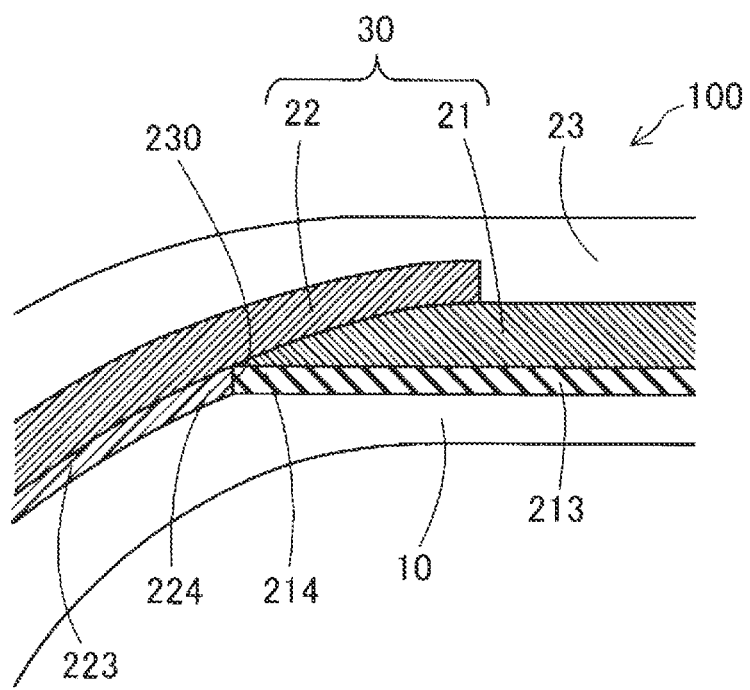
FIG. 2 is an enlarged view of a portion inside a broken line frame P shown in FIG. 1.

FIG. 2 is an enlarged view of a portion inside a broken line frame P shown in FIG. 1. The cylindrical portion 21 includes a film made of an epoxy resin on a surface on an inner side (inner surface) of the cylindrical portion 21. The inner side of the cylindrical portion 21 indicates a side of the cylindrical portion 21 that is closer to a center O of the high-pressure tank 100 (center O side). The film formed on the inner surface of the cylindrical portion 21 is referred to as a "first film 213". The thickness of the first film 213 is thinner than the thickness of the cylindrical portion 21. This makes it possible to form a film using an inexpensive and highly stable epoxy resin.

As shown in FIG. 1, the dome portions 22 each have a shape in which the outer diameter gradually increases from one end thereof toward an opening end 221 that is the other end. The opening end 221 is the end closer to the center O of the high-pressure tank 100 from the ends of the dome portion 22 along a direction of a central axis CA of the high-pressure tank 100. The opposite end contacts with the first neck 40 or the second neck 41. The dome portion 22 has a shape obtained by cutting a part of a substantial sphere that is hollow. In addition, the dome portion 22 can adopt various shapes other than the above. In the manufacturing method described later, the dome portions 22 are joined to the cylindrical portion 21 and the high-pressure tank 100 in which the dome portions 22 are disposed on the respective sides of the cylindrical portion 21 is manufactured. In the present embodiment, the dome portions 22 are each disposed such that the opening end 221 is located on an outer side of the cylindrical portion 21. Note that, the dome portion 22 may be disposed such that the opening end 221 is located on the inner side of the cylindrical portion 21.

As shown in FIG. 2, the dome portion 22 has a film made of an epoxy resin on the inner surface of the dome portion 22. The inner side of the dome portion 22 indicates a side of the dome portion 22 closer to the center O of the high-pressure tank 100 (center O side). The film provided on the inner surface of the dome portion 22 is referred to as a "second film 223". The thickness of the second film 223 is thinner than the thickness of the dome portion 22. In the present embodiment, the thickness of the second film 223 is substantially equal to the thickness of the first film 213. The thicknesses of the first film 213 and the second film 223 may be different from each other. Further, materials of the first film 213 and the second film 223 may be different from each other. In FIG. 2, the thicknesses of the first film 213 and the second film 223 are exaggerated.

The first film 213 and the second film 223 are joined in a manner such that a side surface of a first end 214 that is an end of the first film 213 and a side surface of a second end 224 that is an end of the second film 223 are joined to each other. A surface where the first end 214 and the second end 224 are joined is referred to as a joined surface 230.

The outer helical layer 23 is a layer formed by helically winding a fiber reinforced resin around the outer surface of the joined body 30 (see FIG. 1). The outer helical layer 23 suppresses movement of the dome portions 22 from the center of the high-pressure tank 100 toward the outside when an internal pressure of the high-pressure tank 100 becomes high.

The first neck 40 includes a communication hole 40a that communicates an inner space of the liner 10 with an external space. The communication hole 40a is provided with a connection device including a valve for charging and discharging gas. The second neck 41 does not have the communication hole 40a that communicates with the external space. However, the second neck 41 may have the communication hole 40a. Further, the second neck 41 may be omitted. The first neck 40 and the second neck 41 are made of a metal such as aluminum or stainless steel.

Figure 3:
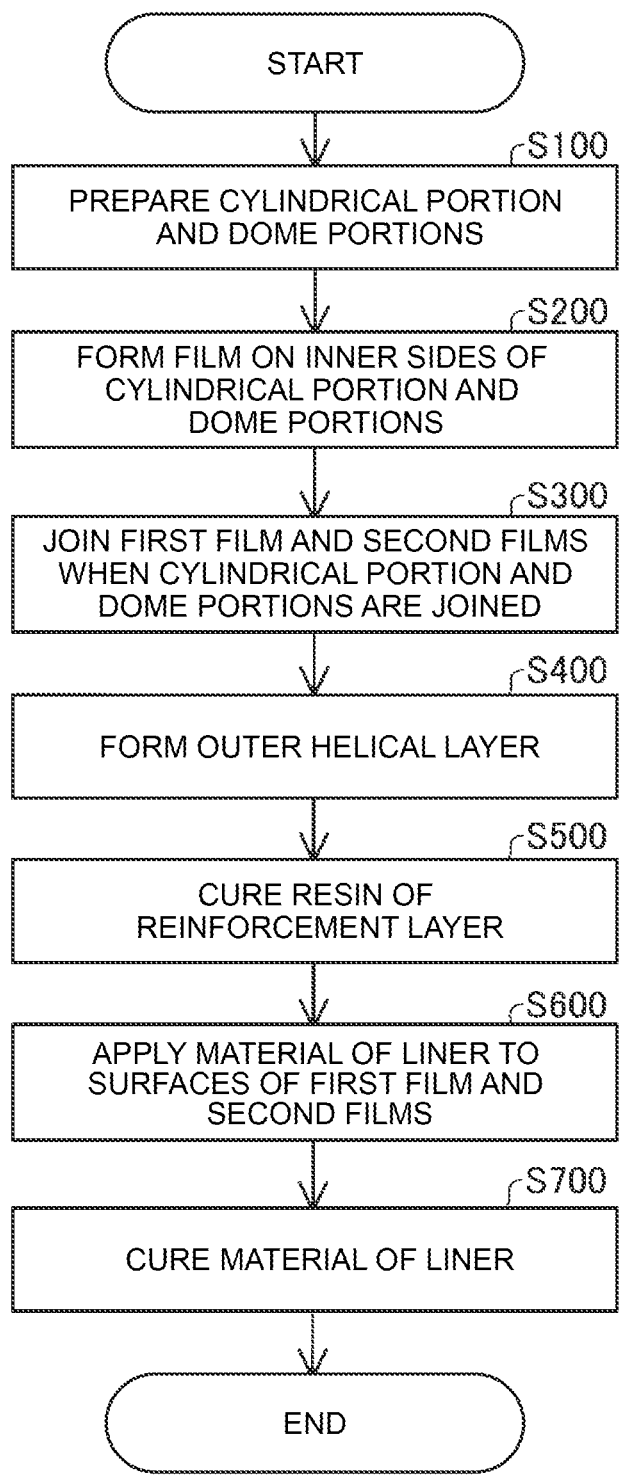
FIG. 3 is an example of a process diagram showing a manufacturing method of the high-pressure tank.
Figure 4:
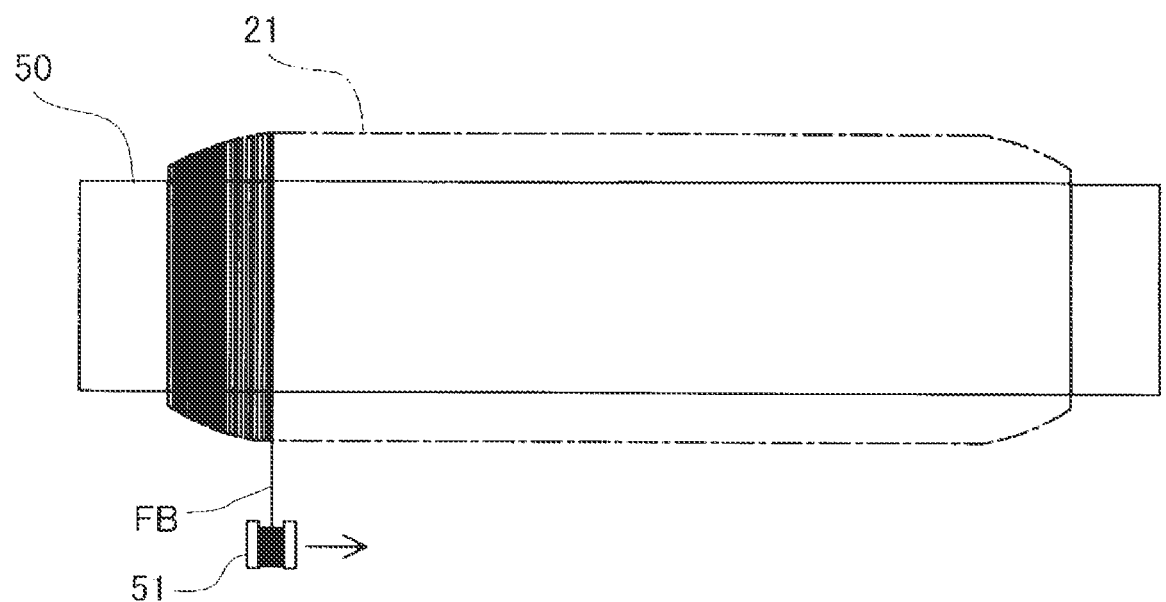
FIG. 4 is an explanatory view showing an example of a method of forming a cylindrical portion.

FIG. 3 is an example of a process diagram showing a manufacturing method of the high-pressure tank 100. FIG. 4 is an explanatory view showing an example of a method of forming the cylindrical portion 21. In step S100 shown in FIG. 3, the cylindrical portion 21 and the dome portions 22 are prepared. In the present embodiment, the cylindrical portion 21 can be formed, using a filament winding method, by winding a fiber bundle FB around a mandrel 50. In the filament winding method, the fiber bundle FB is wound around the mandrel 50 by moving a fiber bundle guide 51 while rotating the mandrel 50.

In general, a method of forming an object made of fiber reinforced resin includes the following.
Wet Filament Winding
Wet filament winding (FW) is a method in which a liquid resin having a low viscosity is impregnated into a fiber bundle immediately before the fiber bundle is wound around the mandrel, and the fiber bundle impregnated with the resin is wound around the mandrel.
Dry Filament Winding
Dry filament winding (FW) is a method in which tow prepreg is prepared by impregnate a fiber bundle with resign and drying the fiber bundle, and the tow prepreg is wound around the mandrel.
Resin Transfer Molding
Resin transfer molding (RTM) is a method in which fiber is placed in a pair of molds consisting of a male mold and a female mold, the molds are closed, and resin is injected through a resin inlet to impregnate the fiber with the resin, thereby forming the object.
Centrifugal-Winding Method
A centrifugal-winding (CW) method is a method of forming a tubular member by attaching a fiber sheet to an inner surface of a rotating cylindrical mold. As the fiber sheet, a fiber sheet impregnated with resin in advance may be used. Alternatively, a fiber sheet not impregnated with resin may be used. In the latter case, after the fiber sheet is wound to form a tubular shape, resin is injected into the mold to impregnate the fiber sheet with the resin.

As the filament winding method, both of the wet FW and the dry FW can be used. The cylindrical portion 21 may be formed using a method other than the filament winding method, such as RTM.

Figure 5:
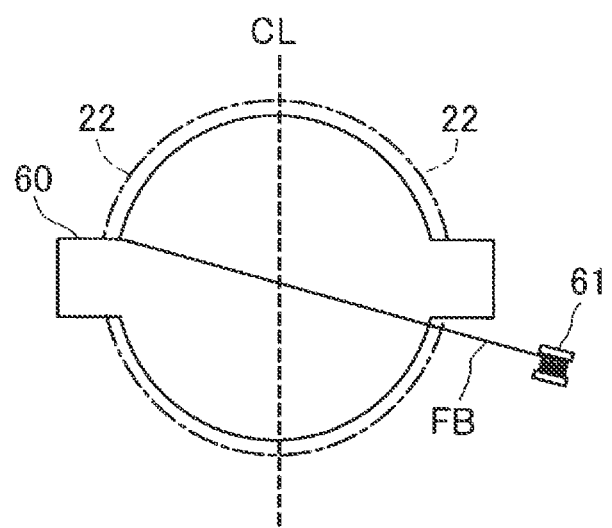
FIG. 5 is an explanatory view showing an example of a method of forming a dome portion.

FIG. 5 is an explanatory view showing an example of a method of forming each of the dome portions 22. In the present embodiment, the dome portion 22 is formed, using the filament winding method, by winding the fiber bundle FB around the mandrel 60. The mandrel 60 is assumed to have an outer shape similar to the outer shape of two dome portions 22 combined. In the filament winding method, the fiber bundle FB is wound around the mandrel 60 by moving a fiber bundle guide 61 while the mandrel 60 is rotated. In FIG. 5, the fiber bundle FB is wound around the mandrel 60 by helical winding. Two dome portions 22 can be obtained by cutting the fiber bundle FB along a cutting line CL after the winding of the fiber bundle FB is completed.

In step S100, the resin of the cylindrical portion 21 and the dome portions 22 is cured. In step S100, "main curing" in which the resin is completely cured until a viscosity of the resin becomes stable is performed. During the process above, the first neck 40 and the second neck 41 are joined to the respective dome portions 22. The first neck 40 and the second neck 41 and the respective dome portions 22 can be joined using an adhesive or a pressure-sensitive adhesive.

Figure 6:
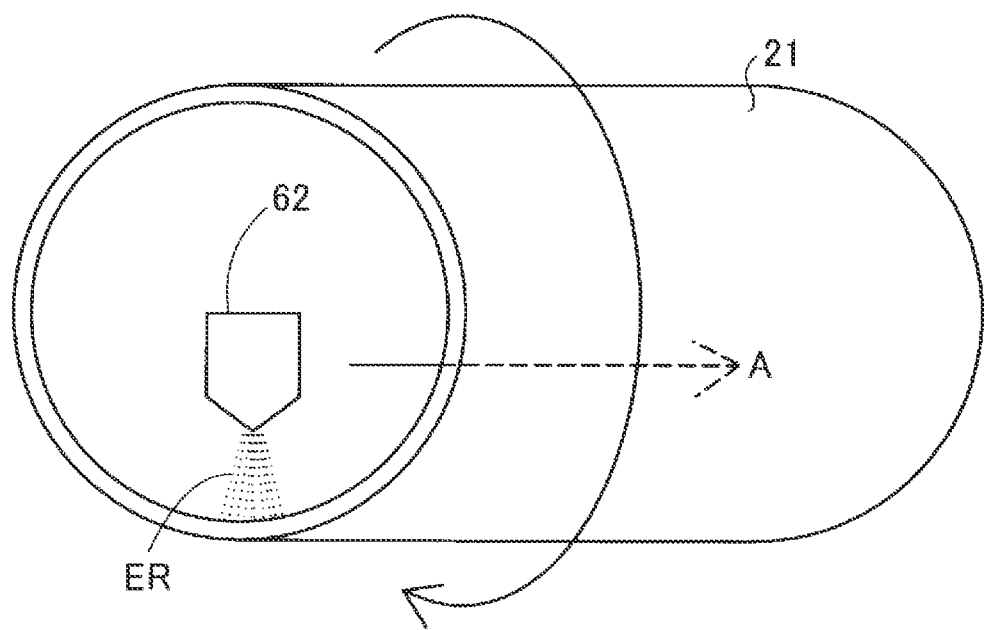
FIG. 6 is an explanatory view showing an example of a method of forming a first film.

FIG. 6 is an explanatory view showing an example of a method of forming the first film 213. In step S200 shown in FIG. 3, a film is formed on the inner surface of each of the cylindrical portion 21 and the dome portions 22. As shown in FIG. 6, for the first film 213, uncured epoxy resin ER is applied to the inner surface of the cylindrical portion 21 that is prepared in step S100 by moving an injector 62 in the direction indicated by an arrow A in FIG. 6. The cylindrical portion 21 is heated and rotated to cure the epoxy resin ER, thereby forming the first film 213.

Figure 7:
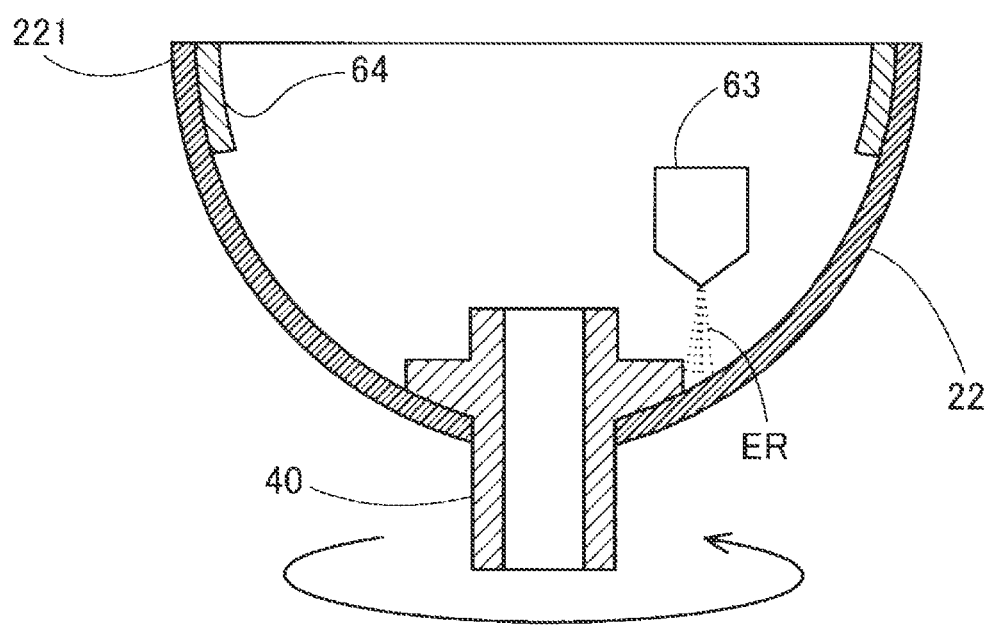
FIG. 7 is an explanatory view showing an example of a method of forming a second film.

FIG. 7 is an explanatory view showing an example of a method of forming the second film 223. The uncured epoxy resin ER is applied from an injector 63 to the inner side of each of the dome portion 22 to which a masking 64 is partially applied, and the dome portion 22 is heated and rotated to cure the epoxy resin ER, thereby forming the second film 223. In the present embodiment, the masking 64 is applied to the inner side of the dome portion 22 and around the opening end 221. The first film 213 and the second film 223 are formed before the dome portion 22 and the cylindrical portion 21 are joined to each other such that formation of the films can be confirmed. With the process above, the first film 213 and the second film 223 can be applied to the inner surfaces of the cylindrical portion 21 and the dome portion 22 to have a substantially uniform thickness. The term "substantially uniform thickness" as used herein means that the thickness of the film falls within the range of average ±10% of the thickness of the film from the inner surface of the cylindrical portion 21 or the dome portions 22.

In step S300 shown in FIG. 3, when the cylindrical portion 21 and each of the dome portions 22 are joined, the first film 213 and the second film 223 are joined. The joined body 30 is formed by joining the outer side of the reduced diameter portion 212 of the cylindrical portion 21 and the inner side of the opening end 221 of each of the dome portions 22 to which the masking 64 is applied in step S200. A thermosetting resin such as an epoxy resin or a phenol resin can be used as an adhesive for joining the cylindrical portion 21 and the dome portions 22 in step S300. In step S300, the reduced diameter portion 212 and the opening end 221 can be adhered to each other, and after the high-pressure tank 100 is formed, the reduced diameter portion 212 and the opening end 221 can be joined more strongly using a friction generated by the internal pressure. Further, the cylindrical portion 21 and the dome portions 22 can be joined more strongly using a method that combines the friction generated by the internal pressure and the adhesive, etc.

When joining the cylindrical portion 21 and the dome portion 22, the first end 214 that is the end of the first film 213 and the second end 224 that is the end of the second film 223 are joined to each other (see FIG. 2). A thermosetting resin such as an epoxy resin or a phenol resin can be used as an adhesive for joining the first end 214 and the second end 224.

Figure 8:
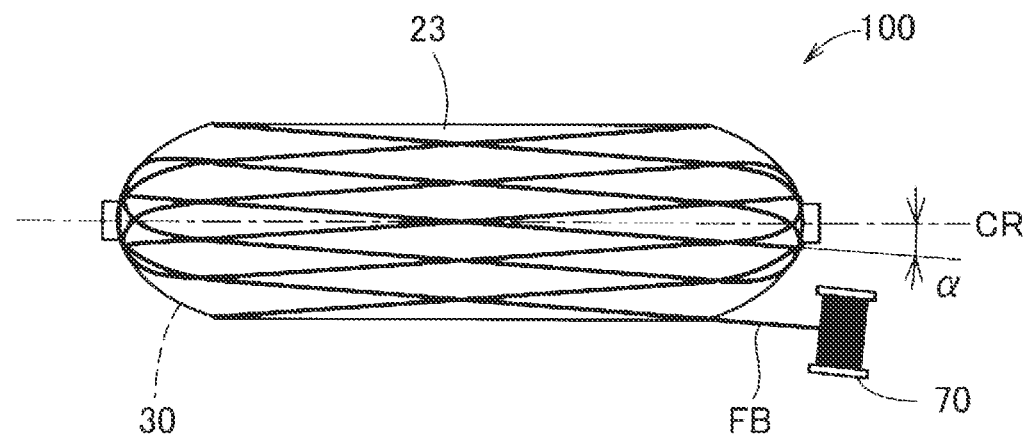
FIG. 8 is a diagram illustrating formation of an outer helical layer.

FIG. 8 is a diagram illustrating formation of the outer helical layer 23. In step S400 shown in FIG. 3, the outer helical layer 23 is formed on the outer side of the joined body 30. In step S400, the outer helical layer 23 and the reinforcement layer 20 are formed, using the filament winding method, by winding the fiber bundle FB around the outer surface of the joined body 30. In the filament winding method, the fiber bundle FB is wound around the joined body 30 by moving a fiber bundle guide 70 while rotating the joined body 30 around a central axis CR of the joined body 30. As described above, the outer helical layer 23 has a function of suppressing movement of the dome portions 22 from the center toward the outside of the high-pressure tank 100 when the internal pressure of the high-pressure tank 100 becomes high. In order to achieve the function above, a winding angle α of the fiber bundle FB is preferably 45 degrees or less. The winding angle α is the angle of the fiber bundle FB with respect to the central axis CR of the joined body 30. As the filament winding method, both the wet FW and the dry FW can be used.

In step S500 shown in FIG. 3, the uncured resin of the reinforcement layer 20 is cured. The curing in step S500 is the main curing described above. In step S600, the liner 10 is formed using reaction injection molding. Specifically, the material of the uncured liner 10 is applied to the surfaces of the first film 213 and the second films 223 that constitute an inner surface of the reinforcement layer 20. The material of the liner 10 is a mixed solution of two or more types of low-molecular-weight, low-viscosity liquid resin materials that produce nylon 6. In the present embodiment, the material of the liner 10 contains η-caprolactam sodium salt as a polymerization catalyst. The mixed solution is injected into the reinforcement layer 20, adheres to the inner surface of the rotating reinforcement layer 20, and undergoes a polymerization reaction to form the polymer nylon 6. In step S700, the nylon 6 is cured as the internal space of the reinforcement layer 20 is cooled. This makes it possible to form the liner 10 using inexpensive and highly reactive nylon.

In step S100, pre-curing that does not lead to main curing may be performed, and in step S500, main curing may be performed. In general, the viscosity of uncured thermosetting resin initially decreases when heated. After that, when the heating is continued, the viscosity increases. When the heating is continued for a sufficient time, the viscosity of the resin becomes equal to or higher than a target value and becomes stable. On the assumption of the progress above, a process in which curing is continued even after the viscosity increases again after the viscosity decreases and reaches the viscosity when the heating is started and curing is completed at any timing before the main curing reaches an end point is referred to as "preliminary curing". When the preliminary curing is performed in step S100 and the main curing is performed in step S500 that will be described later, the cylindrical portion 21 and the dome portions 22 can be adhered to each other with the viscosity of the resin before the main curing. Therefore, the cylindrical portion 21 can be more firmly joined to the dome portions 22 and the outer helical layer 23, and the dome portions 22 can be more firmly joined to the cylindrical portion 21 and the outer helical layer 23.

The inventor has found a possibility that, when the fiber used to form the reinforcement layer is carbon fiber, and the liner is formed by injecting the material of the liner containing the polymerization catalyst and causing a polymerization reaction, a component that deactivates the polymerization catalyst contained in the reinforcement layer inhibits curing of the material of the liner and thus the monomer of the material of the liner remains in the high-pressure tank. The component that is contained in the reinforcement layer and that deactivates the polymerization catalyst indicates a component that is not intentionally contained in the reinforcement layer such as water, or a component that is intentionally contained in the reinforcement layer. A significant amount of cost is required to remove the deactivating component from the reinforcement layer.

The inventor has found that a curing agent for curing the epoxy resin film according to the present embodiment is less likely to be deactivated by the component contained in the reinforcement layer 20. Examples of the curing agent include polyfunctional compounds such as polyamines, derivatives of polyamines, polyhydrochloric acid, and anhydrides thereof. Use of the epoxy resin makes it possible to form a film between the inner side of the reinforcement layer 20 and the liner 10 without using the polymerization catalyst that is deactivated by the component contained in the reinforcement layer 20. Therefore, the polymerization catalyst contained in the material of the liner 10 can be suppressed from being deactivated by the component contained in the reinforcement layer 20. This can suppress curing of the material of the liner 10 from being inhibited when the material of the liner 10 is cured, thereby suppressing residue of the monomer. As described above, in the present embodiment, the high-pressure tank 100 is mounted on the fuel cell vehicle. Poisoning of a fuel cell stack by the monomer remaining in the high-pressure tank can be suppressed. Further, use of an inexpensive and highly reactive epoxy resin makes it possible to manufacture the high-pressure tank 100 without significantly increasing the production cost.

The materials of the first film 213 and the second film 223 are not limited to the epoxy resin. For example, the first film 213 and the second film 223 may be formed in a manner such that a sheet-type ethylene-vinyl alcohol copolymer (EVOH) resin film is separately prepared and attached to the inner surface of each of the cylindrical portion 21 and the dome portions 22. Alternatively, the first film 213 and the second film 223 may be formed in a manner such that a sheet-type nylon is prepared by curing the nylon material through the polymerization reaction and attached to the inner surfaces of the cylindrical portion 21 and the dome portions 22. In this case, even when the nylon material contains the polymerization catalyst that is deactivated by the component contained in the reinforcement layer, the polymerization catalyst is not used when the film is formed in step S200. Therefore, the nylon film can be formed without causing monomerization. In addition to nylon, a polyurethane film or a polyester film can also be formed using the same method. A polyethylene film can also be formed by injection molding.

B. Second Embodiment

Figure 9:
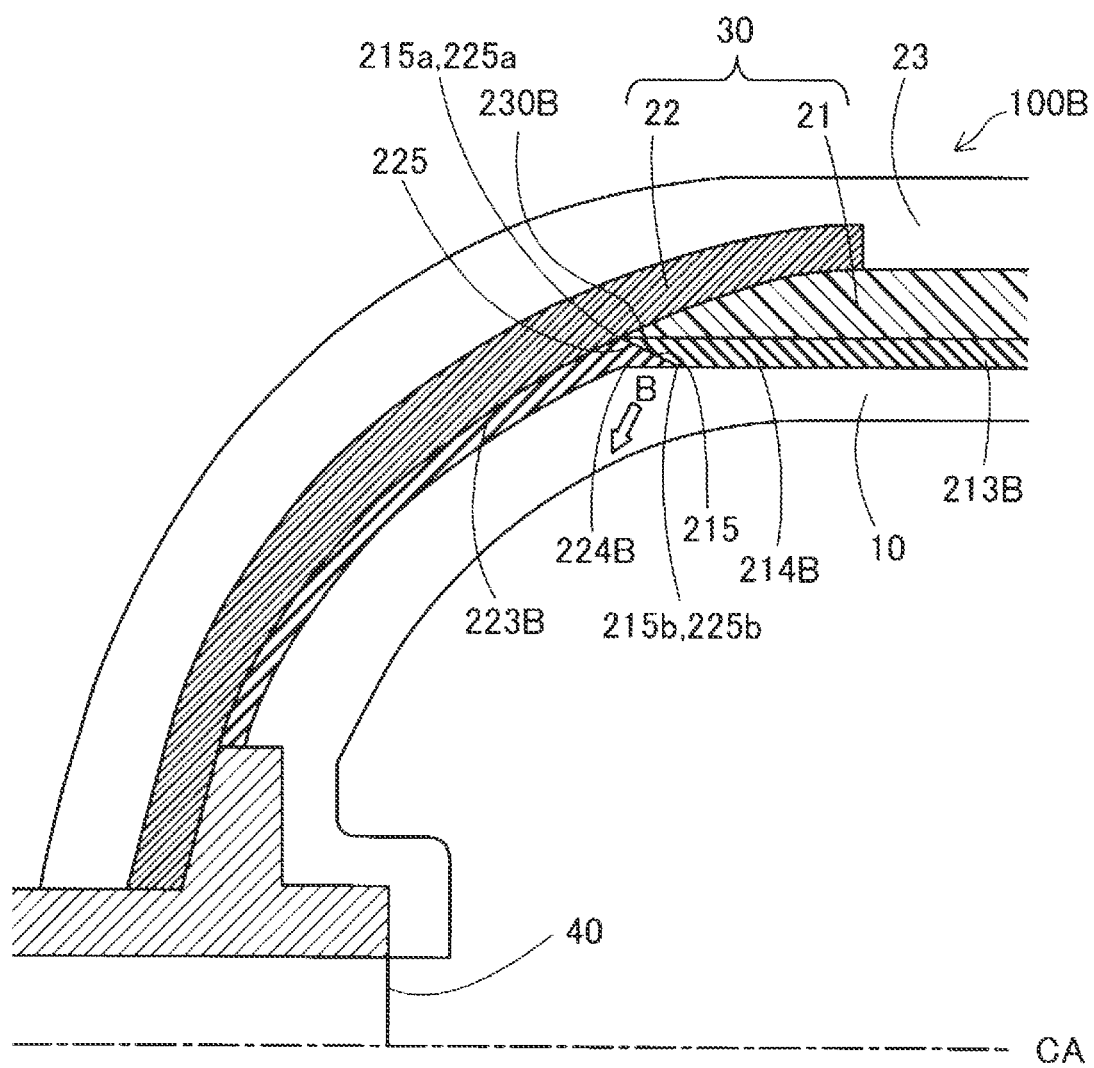
FIG. 9 is a sectional view showing a configuration of a high-pressure tank according to a second embodiment.

FIG. 9 is a sectional view showing a configuration of a high-pressure tank 100B according to a second embodiment. In the second embodiment, shapes and forming methods of a first film 213B and a second film 223B are different from those of the first embodiment. The other configurations are the same as those in the first embodiment. Therefore, the same reference signs are assigned and the description thereof will be omitted.

Hereinafter, the high-pressure tank 100 will be described with a focus on the portion shown in FIG. 9. A first end 214B of the first film 213B according to the second embodiment is provided with an inclined surface facing the direction indicated by an arrow B. The direction indicated by the arrow B is a direction that inclines with respect to the central axis of the cylindrical portion 21. The inclined surface formed on the first end 214B is referred to as a first inclined surface 215. The central axis of the cylindrical portion 21 coincides with the central axis CA of the high-pressure tank 100. A second end 224B of the second film 223B is provided with an inclined surface facing the first inclined surface 215. The inclined surface formed on the second end 224B is referred to as a second inclined surface 225. The first inclined surface 215 has a far end 215a that is far from the central axis CA of the high-pressure tank 100 and a close end 215b that is close to the central axis CA when viewed in a sectional view. The second inclined surface 225 has a far end 225a that is far from the central axis CA and a close end 225b that is close to the central axis CA when viewed in a sectional view. In the present specification, the term "facing the first inclined surface 215" means that, when the far end 215a and the close end 215b of the first inclined surface 215 are arranged along the central axis CA, the far end 215a is located closer to the first neck 40 than the close end 215b, and when the far end 225a and the close end 225b of the second inclined surface 225 are arranged along the central axis CA, the far end 225a is located closer to the first neck 40 than the close end 225b. The first inclined surface 215 and the second inclined surface 225 are joined to each other.

Figure 10:
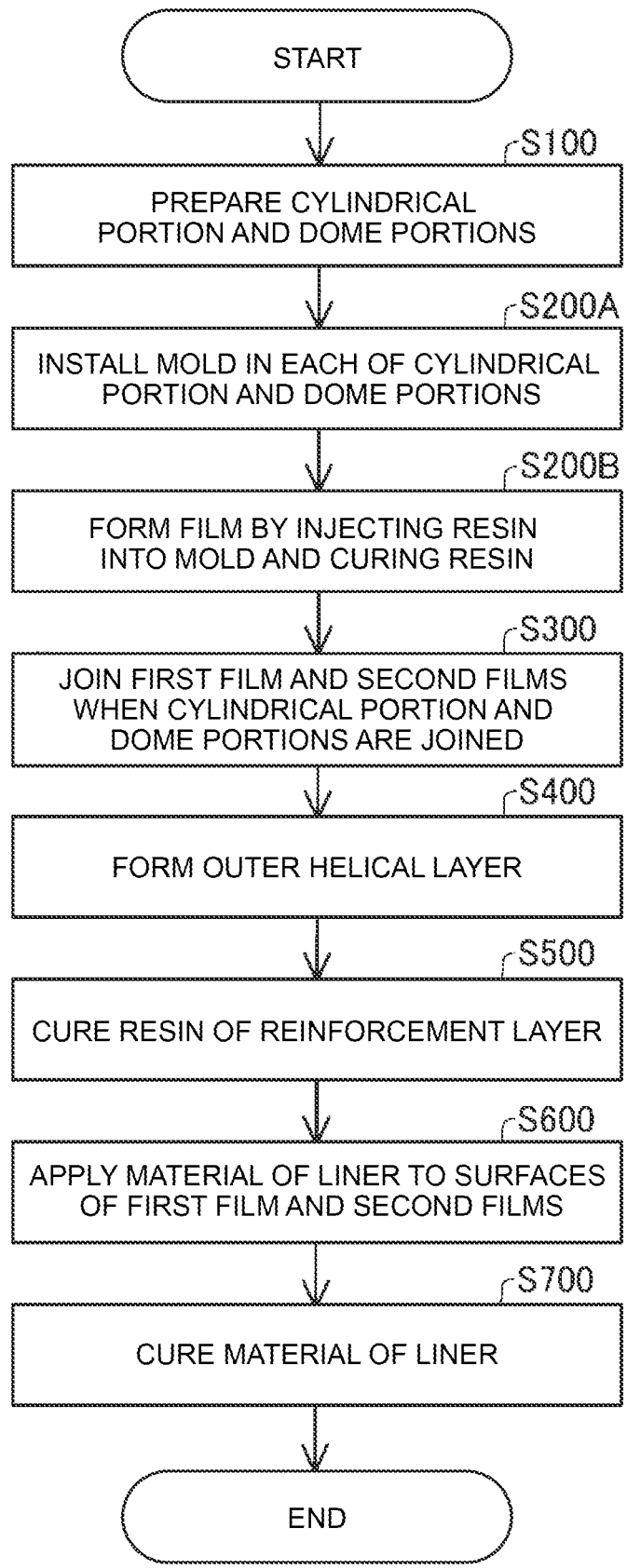
FIG. 10 is an example of a process diagram showing a manufacturing method of the high-pressure tank 100 according to the second embodiment.

FIG. 10 is an example of a process diagram showing a manufacturing method of the high-pressure tank 100B according to the second embodiment. The same steps as those of the first embodiment are designated by the same reference signs, and detailed description thereof will be omitted.

Figure 11:
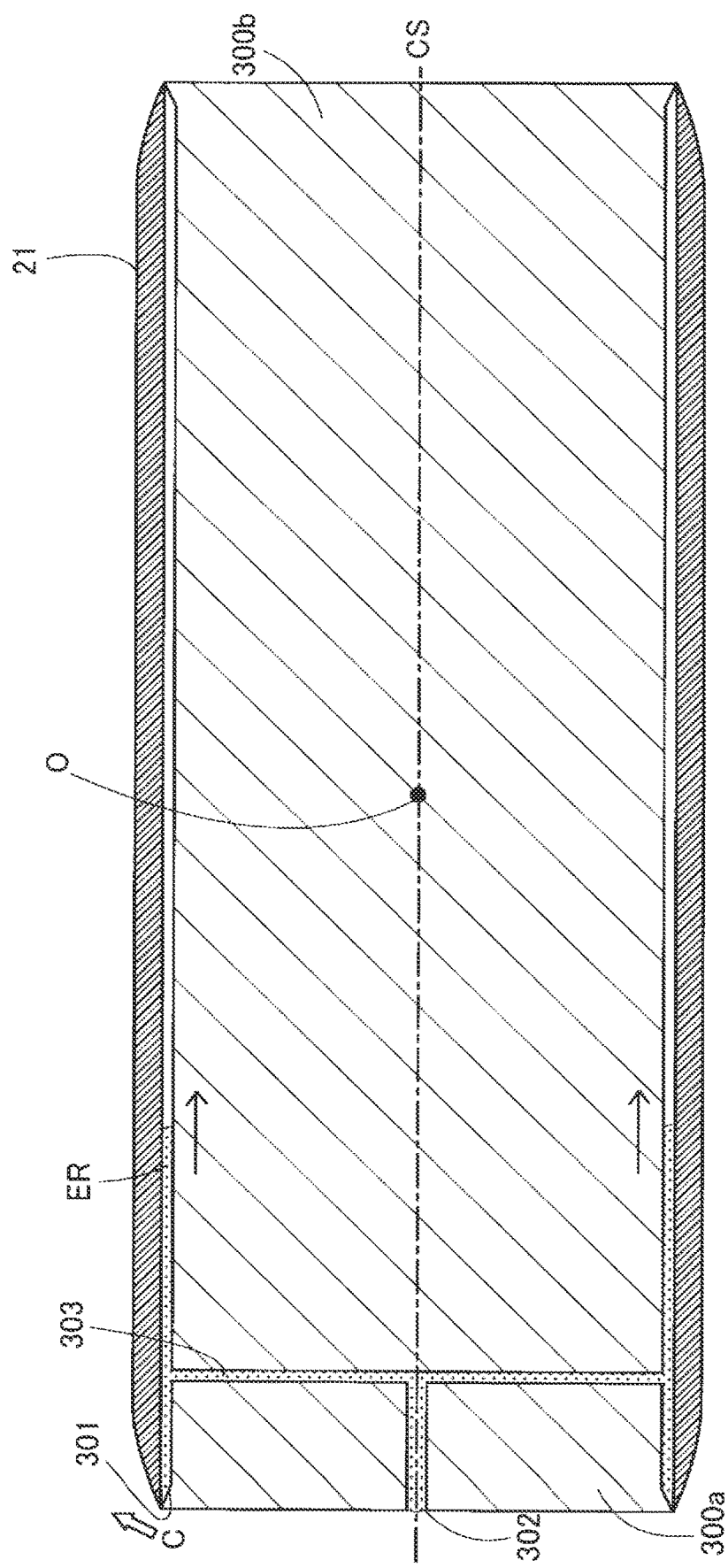
FIG. 11 is an explanatory view showing an example of a method of forming a first film.

FIG. 11 is an explanatory view showing an example of a method of forming the first film 213B. Hereinafter, the description will be made focusing on the upper left portion in FIG. 11. In step S200A shown in FIG. 10, a mold is installed in each of the cylindrical portion 21 and the dome portions 22. In step S200B, the uncured epoxy resin ER is injected into the mold to form the first film 213B and the second film 223B.

First molds 300a, 300b are installed in the cylindrical portion 21. The first mold 300a has a substantially cylindrical shape that is hollow in a central portion. The first mold 300a has a mold inclined surface 301 and a first gate 302. The mold inclined surface 301 is provided at an end of the first mold 300a (see the upper left portion in FIG. 11). The mold inclined surface 301 faces the direction indicated by an outline arrow C that is a direction inclined with respect to a central axis CS of the cylindrical portion 21. The direction indicated by the outline arrow C is a direction facing the direction indicated by the outline arrow B in FIG. 9. The first gate 302 is an opening through which the epoxy resin ER is injected.

The first mold 300b has a substantially cylindrical shape. The dimension of the first mold 300b in a direction along a central axis CS is larger than the dimension of the first mold 300a. The first mold 300b has an inclined surface corresponding to the mold inclined surface 301 of the first mold 300a. The first mold 300a and the first mold 300b are disposed in the cylindrical portion 21 such that a gap is provided between the first mold 300a and the first mold 300b in a direction of the central axis CS of the cylindrical portion 21. The gap provided is referred to as a first flow path 303.

When the uncured epoxy resin ER is injected from the first gate 302, the epoxy resin ER passes through the first flow path 303 and enters between the cylindrical portion 21 and the first molds 300a, 300b. An amount of the epoxy resin ER that is required to form the film is injected.

After heat is applied to the first molds 300a, 300b and the epoxy resin ER is cured, the first mold 300a is pulled out to the left in FIG. 11, and the first mold 300b is pulled out to the right in FIG. 11. The excess epoxy resin ER protruding from the first film 213B is cut off with a cutter, whereby the first film 213B having the first inclined surface 215 can be formed (see FIG. 9).

Figure 12:
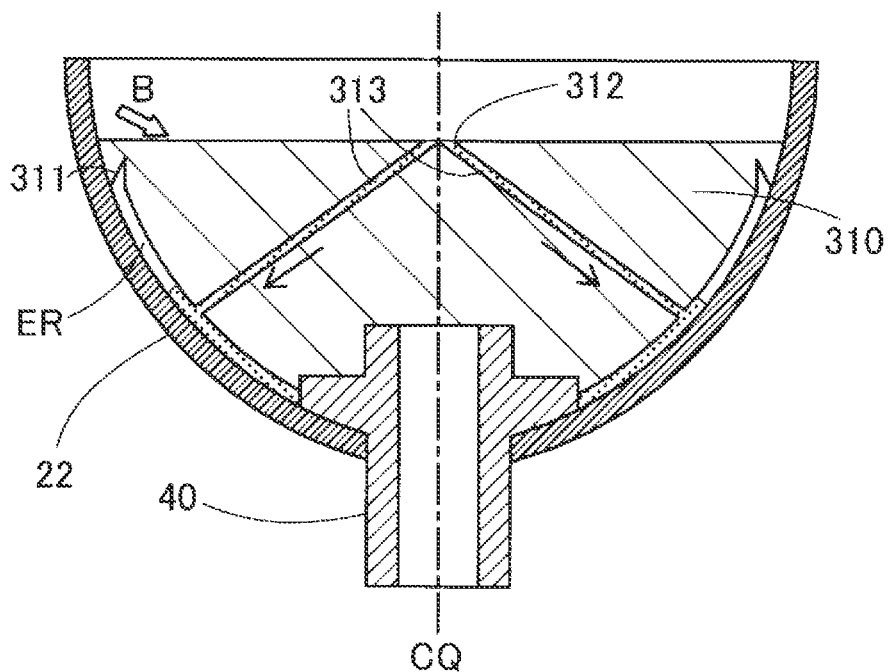
FIG. 12 is an explanatory view showing an example of a method of forming a second film.

FIG. 12 is an explanatory view showing an example of a method of forming the second film 223B. Although the entire dome portion 22 is shown in FIG. 12, the description below will be made focusing on the left half portion of the dome portion 22. A second mold 310 installed in the dome portion 22 has a mold inclined surface 311, a second gate 312, and a second flow path 313. The mold inclined surface 311 is provided at the end of the second mold 310, and faces the direction indicated by the outline arrow B that is the direction inclined with respect to a central axis CQ of the dome portion 22. The outline arrow B coincides with the direction indicated by the outline arrow B in FIG. 9. The central axis CQ of the dome portion 22 coincides with the central axis CS of the cylindrical portion 21.

The second gate 312 is an opening provided at the center of the second mold 310. The second flow path 313 is a flow path through which the uncured epoxy resin ER flows. The second mold 310 according to the present embodiment has two second flow paths 313. The number of the second flow paths 313 may be a number other than two. Further, the second gate 312 may be provided at a location other than the center of the second mold 310. A liquid epoxy resin ER is injected in the directions indicated by arrows through the second gate 312 of the second mold 310, and the second mold 310 is heated while the dome portion 22 is rotated. With the process above, the epoxy resin ER is cured. After that, the second mold 310 is removed from the dome portion 22. With the process above, the second film 223B having the second inclined surface 225 facing the first inclined surface 215 can be formed (see FIG. 9).

In step S300 shown in FIG. 10, when the cylindrical portion 21 and the dome portion 22 are joined to each other, the first inclined surface 215 of the first film 213B and the second inclined surface 225 of the second film 223B are joined to each other. When the first inclined surface 215 and the second inclined surface 225 are joined to each other, a joined surface 230B between the first end 214B of the first film 213B and the second end 224B of the second film 223B faces the direction indicated by the arrow B that is a direction inclined with respect to the central axis CS of the cylindrical portion 21. Therefore, as compared with the case where the first inclined surface 215 and the second inclined surface 225 face in a direction parallel to the central axis CS of the cylindrical portion 21, an area of the joined surface 230B between the first inclined surface 215 and the second inclined surface 225 becomes larger. Even when the monomer is generated during curing of the material of the liner 10 and the monomer moves in a gap of the joined surface 230B, the monomer can be suppressed from reaching the reinforcement layer 20, as compared with the case where the joined surface between the first inclined surface and the second inclined surface faces in a direction parallel to the central axis CS of the cylindrical portion 21.

C. Other Embodiment (C1) FIG. 13 is a diagram illustrating joining of a first film 213C and a second film 223C in the other embodiment 1.

Figure 13:
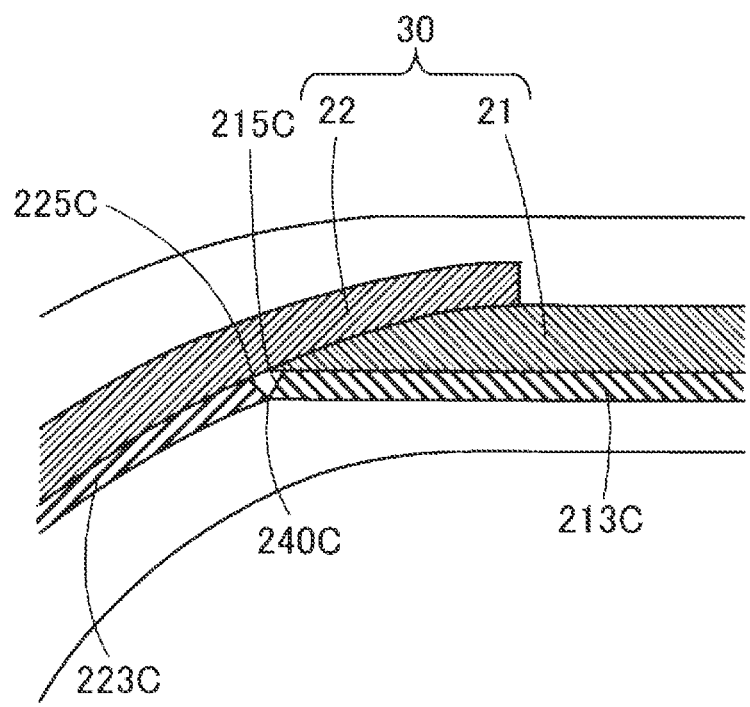
FIG. 13 is a diagram illustrating joining of the first film and the second film in the other embodiment 1.

FIG. 13 corresponds to FIG. 9. In FIG. 13, the central axis CA of the high-pressure tank 100 and the first neck 40 are omitted. In the second embodiment, the first inclined surface 215 facing the direction inclined with respect to the central axis CA and the second inclined surface 225 facing the first inclined surface 215 are joined. However, as shown in FIG. 13, a first inclined surface 215C and a second inclined surface 225C do not have to face each other. Specifically, the first inclined surface 215C and the second inclined surface 225C each have a far end that is far from the central axis CA of the high-pressure tank 100 and a close end that is close to the central axis CA when viewed in a sectional view. When the far ends and the close ends of the first inclined surface 215C and the second inclined surface 225C are arranged along the central axis CA, the close end of the first inclined surface 215C that is close to the central axis CA may be located closer to the first neck 40 than the far end that is far from the central axis CA, and the far end of the second inclined surface 225C that is far from the central axis CA may be located closer to the first neck 40 than the close end that is close to the central axis CA. In this case, a part of the first film 213C and a part of the second film 223C are joined at a joining portion 240C.

(C2) In the embodiment above, the high-pressure tank 100 is mounted on the fuel cell vehicle so as to supply hydrogen to the fuel cell, for example. However, the high-pressure tank 100 may be mounted on another vehicle such as an electric vehicle or a hybrid vehicle in addition to the fuel cell vehicle, or may be mounted on another moving body such as a ship, an airplane, or a robot. Further, the high-pressure tank 100 may be provided in a stationary facility such as a house or a building.

(C3) In the first embodiment, a film is formed on each of the cylindrical portion 21 and the dome portions 22, and then the cylindrical portion 21 and the dome portions 22 are joined. However, a film may be formed by injecting the material of the film to the inside and curing the injected material after the cylindrical portion and the dome portions are joined.

(C4) In the second embodiment, the uncured epoxy resin is cured by heating the mold. However, depending on the type of resin injected into the mold, the resin may be cured by heat applied to the cylindrical portion and the dome portions when the cylindrical portion and the dome portions are formed in step S100, or the resin may be cured by cooling as the resin is left to stand.

The present disclosure is not limited to the above embodiments, examples, and modifications, and can be implemented in various configurations without departing from the scope of the disclosure. For example, the technical features in the embodiments, examples, and modifications corresponding to the technical features in the aspects described in the summary may be appropriately replaced or combined in order to solve part of or all of the above issues or in order to achieve part of or all of the above effects. When the technical features are not described as essential in this specification, the technical features can be deleted as appropriate.

What is claimed is:

1. A manufacturing method of a high-pressure tank including a reinforcement layer configured of fiber reinforced resin including carbon fiber and a liner provided on an inner side of the reinforcement layer, the manufacturing method comprising:
    a step (a) of preparing the reinforcement layer including a cylindrical portion and a pair of dome portions, the dome portions disposed at respective ends of the cylindrical portion;
    a step (b) of forming a film on an inner surface of each of the cylindrical portion and the dome portions without using a polymerization catalyst that is deactivated by a component contained in the reinforcement layer;
    a step (c) of applying a material of the liner to a surface of the film, the material being an uncured material of the liner and containing the polymerization catalyst; and
    a step (d) of forming the liner by curing the material of the liner applied through a polymerization reaction.

2. The manufacturing method according to claim 1, wherein the step (b) may include:
    a step (b1) of forming a first film on the inner surface of the cylindrical portion of the reinforcement layer;
    a step (b2) of forming a second film on the inner surface of each of the dome portions of the reinforcement layer; and
    a step (b3) of joining an end of the first film and ends of the second films when the dome portions are joined to the respective ends of the cylindrical portion.

3. The manufacturing method according to claim 2, wherein:
    the step (b1) includes a step of forming the first film such that the end of the first film to be joined to the end of the second film in the step (b3) configures a first inclined surface that is an inclined surface facing a direction inclined with respect to a central axis of the cylindrical portion;
    the step (b2) includes a step of forming the second film such that the end of the second film to be joined to the end of the first film in the step (b3) configures a second inclined surface that is an inclined surface facing the first inclined surface; and
    the step (b3) includes a step of joining the first inclined surface and the second inclined surface.

4. The manufacturing method according to claim 1, wherein the step (b) is a step of forming the film using an epoxy resin.

* * * * *